United States Patent [19]
Tice

[11] Patent Number: 4,907,789
[45] Date of Patent: Mar. 13, 1990

[54] CUTTING BOARD ASSEMBLY

[76] Inventor: Ralph Tice, 126 Waterford Rd., Island Park, N.Y. 11558

[21] Appl. No.: 88,807

[22] Filed: Aug. 24, 1987

[51] Int. Cl.⁴ .............................................. B23Q 3/00
[52] U.S. Cl. ....................................... 269/13; 269/15; 269/289 R; 269/302.1
[58] Field of Search ............... 108/24, 25, 26; 248/99, 248/101; 269/289 R, 302.1, 15, 327, 13

[56] References Cited

U.S. PATENT DOCUMENTS

| 189,202 | 4/1877 | Eberhard | 248/101 |
|---|---|---|---|
| 4,338,979 | 7/1982 | Dow | 248/101 |
| 4,653,737 | 3/1987 | Haskins et al. | 269/289 R |

FOREIGN PATENT DOCUMENTS 2343461 3/1976 France ............................ 269/289 R Primary Examiner—Robert C. Watson
Attorney, Agent, or Firm—Collard, Roe & Galgano

[57] ABSTRACT

A cutting board assembly is disclosed. The assembly includes a board member which has an upper cutting surface with a groove around the periphery thereof. The cutting surface includes an elongated slot therethrough with the groove being inclined towards the slot. A generally L-shaped flange extends from the underside of the board and surrounds the elongated slot. A plastic bag is adapted to fit over a leg of the L-shaped flange which extends outwardly of the elongated slot. An elastic band is provided to sealably attach the plastic bag around the generally L-shaped flange.

8 Claims, 3 Drawing Sheets

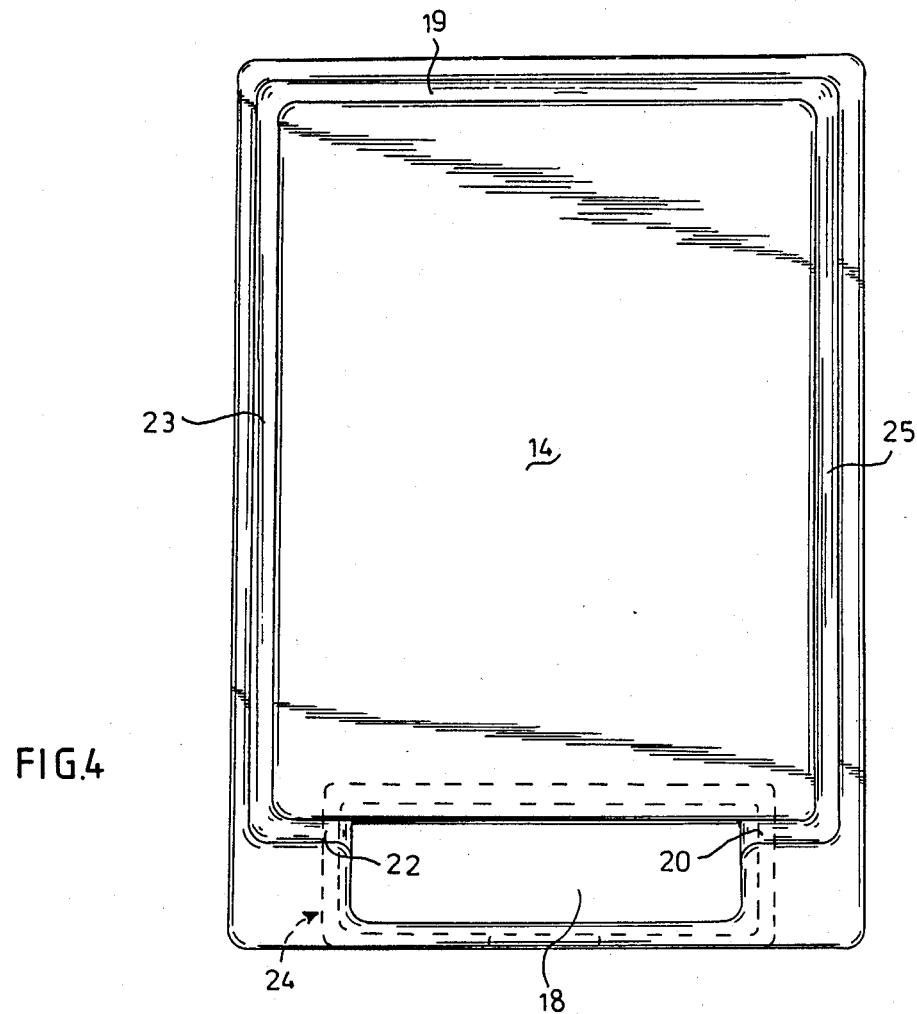

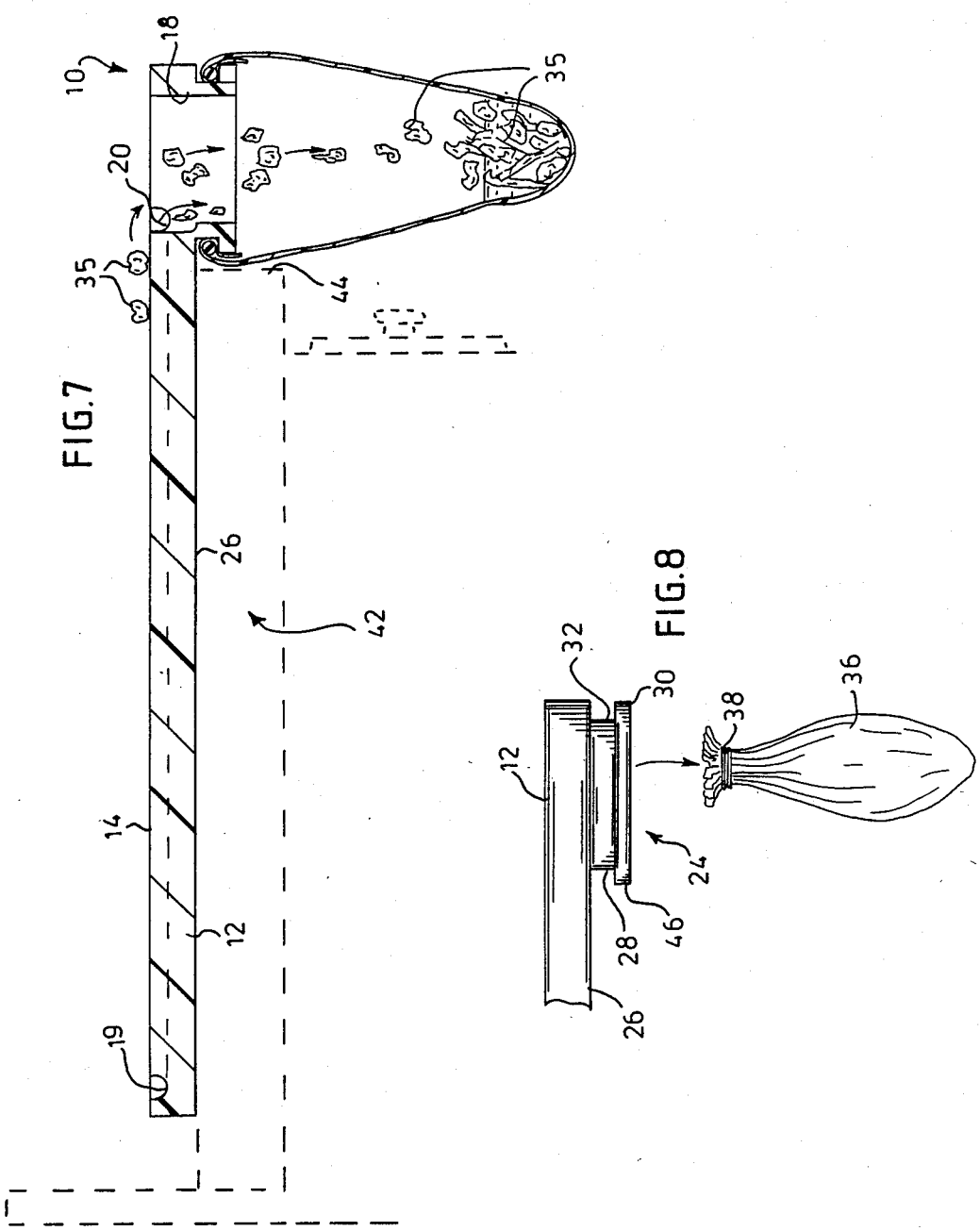

CUTTING BOARD ASSEMBLY

BACKGROUND OF THE INVENTION

1. Field of the Invention

This invention relates to a cutting board assembly for cutting meats or the like. More specifically, this invention relates to an improved cutting board assembly which includes a disposable container which captures juices, gravy and scraps produced during the carving operation.

2. DESCRIPTION OF THE PRIOR ART

Various cutting boards for cutting meats or the like have been suggested which include a well or reservoir into which liquids may drain and be collected. U.S. Pat. No. 1,837,535 to Duffy et al. discloses a cutting board adapted for cleaning poultry which includes a well at one end. U.S. Pat. No. 2,963,957 to P. Tashman discloses a roast carving assembly which includes an inclined surface emptying into a well. U.S. Pat. No. 3,785,008 to Parker shows a fish scaler which includes a flat board with a plastic bag located a one end thereof.

U.S. Pat. No. 3,598,164 to George August discloses a carving board with an inclined upper surface including an aperture at the lower end thereof. A receptacle is provided which is removably attached to the underside of the cutting board below the aperture for accumulating liquids or cut materials. The difficulty with the August design is that the receptacle is shallow and not capable of holding a large amount of waste. Furthermore the receptacle is not disposable and must be cleaned and reused. In addition, the cutting board assembly has only limited engagement with the surface upon which it sits thereby allowing movement of the cutting board assembly during the cutting or carving operation.

SUMMARY OF THE INVENTION

It is therefore an object of this invention to provide a cutting board assembly which includes a large, disposable waste receptacle which is adapted for quick application or removal from the cutting board assembly.

It is another object of the invention to provide a cutting board assembly which may be placed on a kitchen counter in a manner whereby movement of the cutting board during use is greatly reduced while still providing a disposable receptacle thereon.

It is still one more object of the invention to provide a cutting board assembly which is easy to use, simple in design and is economical to manufacture.

Accordingly, the present invention provides a cutting board assembly which includes a board member having an upper cutting surface with a groove around the periphery thereof. At one end of the cutting surface there is an elongated slot which extends through the cutting board. The groove around the periphery of the cutting surface is inclined towards the slot in the board. A generally L-shaped flange extends from the underside of the board and surrounds the elongated slot therethrough. A removable container or plastic bag is adapted to fit over a leg of the L-shaped flange which leg extends outwardly of the elongated slot. An elastomeric band is utilized to sealably attach the plastic bag onto the generally L-shaped flange. The band is located between the bottom surface of the cutting board and the top surface of the outwardly extending leg of the flange. The outwardly extending leg of the generally L-shaped flange includes a recessed portion to provide for the quick application and removal of the elastic band and plastic bag from the flange.

These and other objects and advantages of the present invention will become apparent from the following description of the accompanying drawings which disclose several embodiments of the invention. It is to be understood that the drawings are to be used for the purpose of illustration only, and not as a definition of the invention.

BRIEF DESCRIPTION OF THE DRAWINGS

FIG. 4 is a top view of the cutting board of the present invention;

FIG. 5 is a cross sectional view of the cutting board shown in FIG. 1 along the line 5—5;

FIG. 6 is a cross sectional view of the cutting board shown in FIG. 1 along the line 6—6;

FIG. 7 is a cross sectional view of the cutting board assembly of the present invention showing the disposable bag assembled to the cutting board and showing the kitchen counter in phantom; and FIG. 8 is a partial elevation view of the cutting board of the present invention with the disposable bag removed and tied off with the elastomeric band.

DESCRIPTION OF THE PREFERRED EMBODIMENTS

Figure 1:
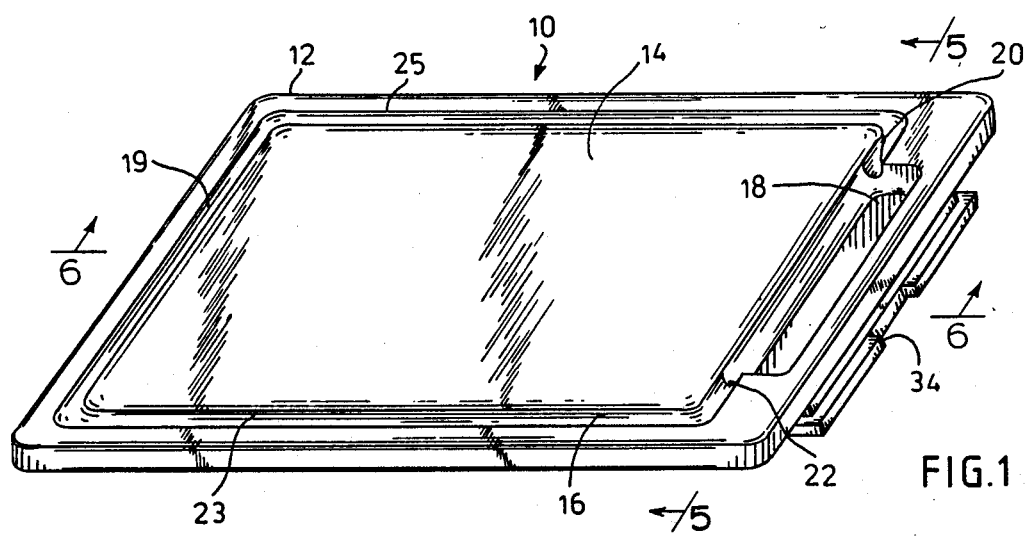
FIG. 1 is an isometric view of the cutting board of the present invention.

Referring to FIGS. 1–8 inclusive, there is shown a cutting board assembly generally denoted as 10 constructed in accordance with the present invention. The cutting board assembly 10 comprises a main board structure 12 fabricated of wood, plastic or the like. It should be noted that the term "board", as used herein, is not intended to limit the materials which can be employed in practicing the invention, and any appropriate material may be so employed.

Board 12 is provided with an upper cutting surface 14 which is generally flat. Upper cutting surface 14 of the board 12 is defined by a groove 16 around the outer periphery thereof. Normally groove 16 is displaced ½ to 1 inch from the peripheral edge of board 12. It is advantageous to place the groove as close to the edge of board 12 as possible to provide for the largest cutting surface 14 commensurate with the practice of the invention as taught.

Cutting board 12 has an elongated slotted opening 18 therethrough at one end therof. Runs 20 and 22 of groove 16 intersect slotted opening 18 at the outer edge thereof. The groove 16 may be either horizontal with respect to surface 14 or preferably may be downwardly inclined towards the slot 18 from the side of board 12 opposite the side containing the slot 18. In FIG. 1 the groove may be downwardly sloped from the left hand side towards the slotted opening 18 on the right hand side thereof. This incline may be accomplished by forming run 19 of groove 16 to a depth less than the depth of the groove at points 20 and 22 and gradually increasing the depth of runs 23 and 25 of groove 16 toward the slotted end of the board. The forming of this configuration can be easily accomplished by molding the board and groove 16 from plastic. Alternatively the depth of groove 16 could remain constant with the entire upper surface, including the cutting surface 14 and groove 16, inclined toward slotted opening 18. Runs 19, 23 and 25 could also be horizontal as long as the depth of runs 20 and 22 is greater to allow for the inflow of liquid.

As can be seen in FIGS. 1-6 the slotted opening 18 extends through the cutting board 12 and is surrounded by a downwardly extending L-shaped flange portion 24 either attached to or formed on bottom surface 26 of cutting board 12. The generally L-shaped flange section 24 has a downwardly extending leg portion 28 and an outwardly extending leg portion 30. The inner surface of the downwardly extending leg portion 28 generally matches the inner periphery of the elongated slot 18. The outwardly extending leg 30 defines a generally rectangular open section 32 between the bottom surface 26 of cutting board 12 and the leg 30. As can be best seen in FIGS. 1 and 3 the leg 30 has a recess portion 34 which faces outwardly of the cutting board. The depth of the recess portion 34 is equal to the depth of slot 32 so that the bottom surface of the recess portion is flush with leg 28 of the generally L-shaped member 24.

Figure 2:
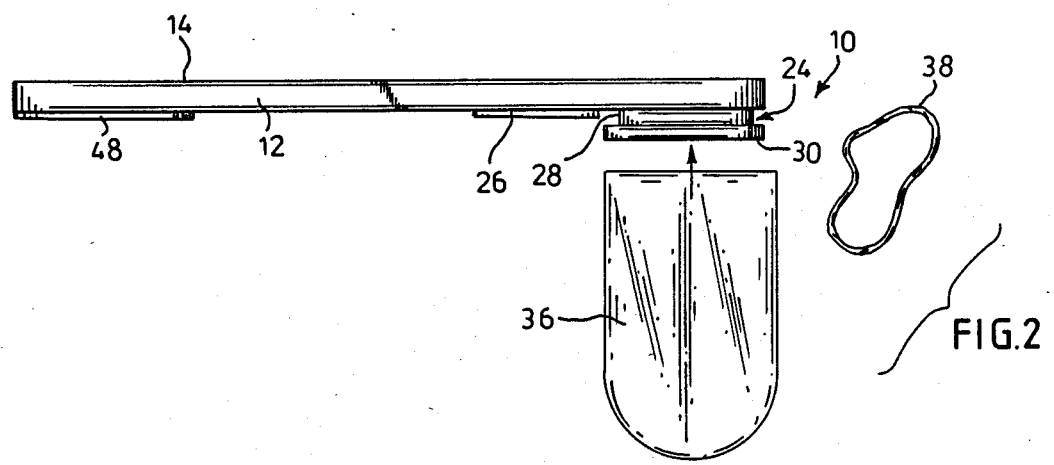
FIG. 2 is a front elevation view of the cutting board of FIG. 1 further showing the disposable bag and elastomeric band of the present invention.
Figure 3:
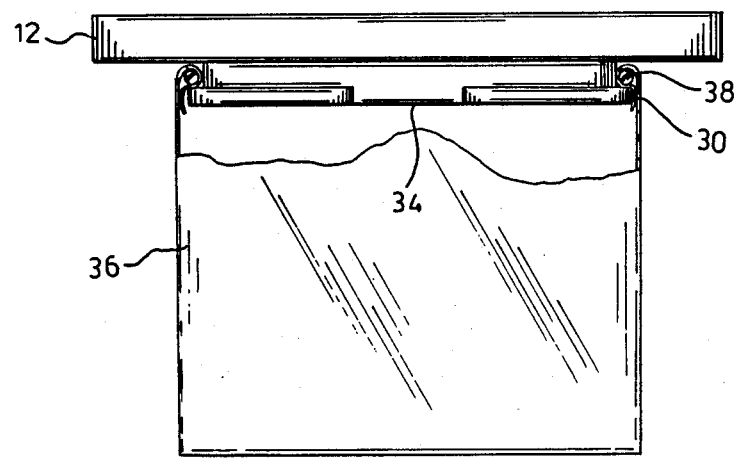
FIG. 3 is a side elevation view of the cutting board of FIGS. 1 and 2 with the disposable container assembled thereto.

FIGS. 2 and 7 show a container 36 which can entirely surround flange section 24 beneath slotted opening 18. In the preferred embodiment the container 36 is a plastic bag which has an opening large enough to entirely surround the flange seciton 24. An elastomeric band 38 is provided to secure plastic bag 36 onto flange 24. The band 38 is so sized that it must be elongated to fit over the flange 24 and, when released, provides an adequate clamping force around groove 32 to sealably clamp bag 36 around flange portion 24. It should be noted that after use the bag 36 may have a considerable weight and that the band 38 must be sized to provide sufficient force to hold the bag onto the flange 24 of the cutting board 12.

Referring to FIGS. 7 and 8, the method of operation of the present invention is shown. It is contemplated that prior to use, bag 36 would be attached to flange 24 by elastomeric band 38. The assembly 10 would then be placed on a counter top shown generally as 42 and slid up against an edge 44 thereof. The inner run 46 of leg 30 on flange 24 would abut edge 44 of counter 42 thereby preventing the cutting board from moving inwardly on counter 42. A friction device such as rubber strips 48 may be attached to the bottom side 26 of cutting board 12 to prevent movement of the cutting board outwardly away from the edge 44 of counter top 42 or from side to side threon. The entire bottom surface 26 of board 12 rests on the counter to allow for a large area of friction contact.

Waste materials 35 formed during the cutting operation may pushed into slot 18 and fall conveniently into bag 36. In addition, fluids produced during any cutting operation are captured by groove 16 and flow in the direction of the downward incline thereof towards slotted opening 18. As can be seen in FIGS. 1 and 7 the downwardly inclined groove 16 terminates at slot 18 at runs 20 and 22 thereof. Therefore essentially all the waste materials developed in any cutting process may be placed into bag 36. Normally bag 36 would be disposable to provide easy cleaning of the cutting board.

In FIG. 8 the elastomeric band 38 utilized to hold bag 36 on the flange 24 may be used to seal the opening of bag 36. In this regard recess 34 is provided so that an easy finger grip of the elastomeric band 36 may be had during either installation or during removal of bag 36 and band 38.

The cutting board assembly of the present invention could also be used to facilitate storage of cut food. Here bag 36 would be suitable for storage in a freezer with the prepared food being moved from cutting surface 14 through elongated slot 18 and into the bag. When the desired amount of prepared food is placed in bag 36, the same procedure as described above can be utilized to remove the band and bag 36 from flange 24 utilizing the band 38 to seal the bag. It can be seen that groove 16 can be advantageously used in this food storage process as say, where fruit is being cut, the juice flows into groove 16, and because of the inclined orientation thereof, flows into slotted opening 18 and into bag 36 so that not only is the fruit able to be stored in the storage bag 36 but all juices produced during preparation are captured.

The cutting board can be used without the disposable container or bag 36 with the flange section 24 placed in a sink. The advantages discussed above concerning mounting the board with respect to the counter 42 would still apply in that the flange 24 would hold the board 12 from movement away from the sink. Waste produced would fall through slot 18 into the sink and could be disposed of through a sink mounted "garbage disposal".

The foregoing description is illustrative of the present invention and various modifications and embodiments have been suggested and others will be readily available to those skilled in the art. Accordingly, it is intended that the present invention be limited only by the scope of the appended claims.

The following is claimed:

1. A cutting board assembly comprising:
   a board member having an upper cutting surface, said cutting surface having a groove around the periphery thereof, said cutting surface including, at one end thereof, an elongated hole therethrough intersecting with said grooves;
   a generally L-shaped flange surrounding said elongated slot forming an outwardly extending leg and flange depending from the underside of said board;
   a container adapted to fit over the outwardly extending leg of said L-shaped flange; and
   means for sealably attaching said container around said outwardly extending leg of said generally L-shaped flange;
   said outwardly extending leg of said generally L-shaped flange includes a recess portion to provide for the quick application and removal of attaching seal means and said container from said flange.

2. A cutting board assembly as set forth in claim 1 wherein said means for sealably attaching said container around said generally L-shaped flange is an elastic band.

3. A cutting board assembly as set forth in claim 2 wherein said container is a plastic bag adapted to receive materials produced during use of the cutting board assembly to provide for easy cleanup.

4. A cutting board assembly as set forth in claim 2 wherein said elastic band is capable of sealing the opening of said plastic bag after the removal of said band and said bag from said generally L-shaped flange.

5. A cutting board assembly as set forth in claim 1 further including a friction means attached to the underside of said board.

6. A cutting board assembly as set forth in claim 5 wherein said flange extending from said cutting board underside is capable of being placed adjacent the edge of a kitchen counter whereby movement of said board towards said counter is prevented by said flange and movement of said board away from said counter is resisted by said friction means.

7. A cutting board assembly as set forth in claim 6 said friction means is a rubber strip bonded to the underside of said board.

8. A cutting board assembly as set forth in claim 1 wherein said groove is downwardly inclined toward said slot.

* * * * *